United States Patent
Carpaij et al.

(10) Patent No.: US 9,506,944 B2
(45) Date of Patent: Nov. 29, 2016

(54) VELOCITY DETERMINATION APPARATUS

(75) Inventors: Mark Carpaij, Eindhoven (NL); Atanas Pentchev, Eidhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 754 days.

(21) Appl. No.: 13/883,007

(22) PCT Filed: Nov. 1, 2011

(86) PCT No.: PCT/IB2011/054849
§ 371 (c)(1),
(2), (4) Date: May 2, 2013

(87) PCT Pub. No.: WO2012/059863
PCT Pub. Date: May 10, 2012

(65) Prior Publication Data
US 2013/0226508 A1 Aug. 29, 2013

(30) Foreign Application Priority Data
Nov. 3, 2010 (EP) ..................... 10189859

(51) Int. Cl.
*G01P 3/36* (2006.01)
*G01S 17/58* (2006.01)
(Continued)

(52) U.S. Cl.
CPC ............. *G01P 3/36* (2013.01); *G01P 3/366* (2013.01); *G01S 7/4916* (2013.01); *G01S 17/58* (2013.01); *G01S 17/875* (2013.01)

(58) Field of Classification Search
CPC ................... G01S 17/05; G01P 3/36
USPC ............. 73/1.37, 1.41; 702/96, 142
See application file for complete search history.

(56) References Cited

U.S. PATENT DOCUMENTS

| 6,233,045 | B1 | 5/2001 | Suni |
| 7,283,214 | B2 | 10/2007 | Xu |

(Continued)

FOREIGN PATENT DOCUMENTS

| CN | 101842719 A | 9/2010 |
| DE | 102008038615 A1 | 3/2009 |

(Continued)

OTHER PUBLICATIONS

Raoul, X. et al., "A Double-Laser Diode Onboard Sensor for Velocity Measurements", IEEE Transactions on Instrumentation and Measurement; vol. 53; No. 1, pp. 95-101, Feb. 2004, IEEE Institute of Electrical and Electronics.

(Continued)

*Primary Examiner* — Andrew Schechter
*Assistant Examiner* — Kaleria Knox
(74) *Attorney, Agent, or Firm* — Larry Liberchuk

(57) ABSTRACT

The invention relates to a velocity determination apparatus (1) for determining a velocity of an object (2). A Doppler frequency measuring unit is adapted to measure Doppler frequencies in at least three different frequency directions, wherein a Doppler frequency calculation unit is adapted to calculate a Doppler frequency for a calculation frequency direction being similar to one of the at least three different frequency directions depending on the Doppler frequencies measured for at least two further frequency directions of the at least three different frequency directions. The velocity can then be determined depending on the calculated Doppler frequency and the measured Doppler frequencies. Since in the calculation frequency direction the measured Doppler frequency is not needed for determining the velocity, a reliable velocity can be determined also in the calculation frequency direction, even if the measurement of the Doppler frequency in this calculation frequency direction is disturbed.

13 Claims, 6 Drawing Sheets

(51) Int. Cl.
*G01S 7/491* (2006.01)
*G01S 17/87* (2006.01)

(56) References Cited

U.S. PATENT DOCUMENTS

| | | |
|---|---|---|
| 2001/0022655 A1 | 9/2001 | Steiff |
| 2007/0058157 A1 | 3/2007 | Deines |
| 2008/0297808 A1 | 12/2008 | Riza |

FOREIGN PATENT DOCUMENTS

| | | | | | |
|---|---|---|---|---|---|
| JP | 5288760 A | | 11/1993 | | |
| NL | EP102008038615 | * | 8/2008 | ................ | G01P 3/36 |
| NL | WO2010084448 | * | 7/2010 | ................ | G01P 3/36 |
| WO | WO2010084448 A1 | | 7/2010 | | |
| WO | WO2010125492 A1 | | 11/2010 | | |

OTHER PUBLICATIONS

Buttner, L. et al., "Determination of the Axial Velocity Component by a Laser-Doppler Velocity Profile Sensor" J. Opt. Soc. Am. A. (JOSA A), vol. 23, Issue 2, pp. 444-454, Feb. 2006, doi:10.1364/JOSAA.23.000444.

Satoh, Y. et al., "Detecting Pole Position by Laser Doppler Distance-Measuring Device", Railway Technical Research Institute Feb. 8, 1938 Hikari-cho, Kokubunji-shi, Tokyo, Japan, http://www.rtri.or.jp/infoce/wcrr97/C229/C229.html, Jul. 29, 2010.

Adrian, R.J., "A Bipolar, Two Component Laser-Doppler Velocimeter", Dept. of Theoretical & Appl. Mech., Univ. of Illinois, Urbana, IL, USA Journal of Physics E: Scientific Instruments, vol. 8, No. 9, 1975, J. Phys. E: Sci. Instrum. 8 723.

* cited by examiner

VELOCITY DETERMINATION APPARATUS

FIELD OF THE INVENTION

The invention relates to a velocity determination apparatus, a velocity determination method and a velocity determination computer program for determining a velocity of an object. The invention relates further to an object comprising the velocity determination apparatus.

BACKGROUND OF THE INVENTION

U.S. Pat. No. 6,233,045 B1 discloses a self-mixing interference sensor for determining a velocity of an object. The self-mixing sensor comprises a laser emitting a laser beam being directed to, for example, the ground. The laser beam is reflected by the ground and the reflected laser beam enters the cavity of the laser. The reflected laser beam, entering the laser cavity, interferes with the present electromagnetic field. The interference, the so called self-mixing interference, appears as intensity variations of the electromagnetic field within the cavity. The main frequency of the self-mixing interference signal is the Doppler frequency, wherein the Doppler frequency is used to determine the velocity of the object.

This determination of the velocity can be disturbed by, for example, harsh automotive environments and tough road conditions, if the object is, for instance, a vehicle. The laser beam may also temporally be blocked by scattering elements between the laser and the road surface, i.e. the ground, or the self-mixing feedback, i.e. the reflected laser beam, may become too weak due to too large defocus or presence of blocking objects like leaves or other rubbish which may be lifted by air turbulence. The quality of determining the velocity can therefore be reduced.

SUMMARY OF THE INVENTION

It is an object of the present invention to provide a velocity determination apparatus, a velocity determination method and a velocity determination computer program for determining a velocity of an object, which allow improving the quality of determining the velocity. It is a further object of the present invention to provide a corresponding object comprising the velocity determination apparatus.

In a first aspect of the present invention a velocity determination apparatus for determining a velocity of an object is presented, wherein the velocity determination apparatus comprises:
  a Doppler frequency measuring unit for measuring a Doppler frequency for at least three different frequency directions,
  a Doppler frequency calculation unit for calculating a Doppler frequency for a calculation frequency direction of the at least three different frequency directions depending on the Doppler frequencies measured for at least two further frequency directions of the at least three different frequency directions,
  a velocity determination unit for determining a velocity of the object depending on the calculated Doppler frequency, which has been calculated for the calculation frequency direction, and the Doppler frequencies for the at least two further frequency directions.

Since the Doppler frequency calculation unit is adapted to calculate a Doppler frequency for a calculation frequency direction of the at least three different frequency directions depending on the Doppler frequencies measured for at least two further frequency directions of the at least three different frequency directions, a reliable Doppler frequency can be determined also in the calculation frequency direction, even if the measurement of the Doppler frequency in this calculation frequency direction is disturbed. In particular, the velocity determination unit can determine a velocity of the object, even if the measurement of the Doppler frequency in the calculation frequency direction is disturbed, by using the calculated Doppler frequency and the Doppler frequencies measured for the at least two further frequency directions, which are different to the calculation frequency direction. This allows improving the quality of determining the velocity of the object.

The object is preferentially a vehicle.

The frequency direction is a direction, in which a Doppler frequency is measured.

The velocity determination unit is preferentially adapted to determine the velocity in three velocity directions for determining a three-dimensional speed. The object moves preferentially in a forward direction within a horizontal plane, wherein the three velocity directions include preferentially the forward direction, a lateral direction, which is preferentially also within the horizontal plane and which is preferentially orthogonal to the forward direction, and a vertical direction.

Preferentially, the Doppler frequencies measured in different frequency directions are measured independently from each other, i.e. the measurement of a Doppler frequency in a first frequency direction is preferentially not influenced by a measurement of a Doppler frequency in a second frequency direction being different to the first frequency direction. The Doppler frequency measuring unit is adapted to measure in each frequency direction a distinct Doppler frequency.

Preferentially, the Doppler frequency calculation unit is adapted to not only calculate the absolute value of the Doppler frequency, but also the sign of the Doppler frequency, wherein the velocity determination unit can be adapted to not only determine the absolute value of the velocity, but also the direction of the velocity.

It is preferred that the velocity determination unit is adapted to determine the velocity in three velocity directions for determining a three-dimensional velocity, wherein the three velocity directions are different to the at least three frequency directions such that a velocity in one of the velocity directions is determinable by a combination of Doppler frequencies measured for the at least three frequency directions. It is further preferred that the Doppler frequency calculation unit is adapted to calculate the Doppler frequency for the calculation frequency direction depending on a linear combination of the Doppler frequencies measured for at least two further frequency directions. It is further preferred that the Doppler frequency calculation unit is adapted to calculate the Doppler frequency for the calculation frequency direction depending on the negative sum of the Doppler frequencies measured for the other at least two frequency directions. This allows calculating the Doppler frequency for the calculation frequency direction with low computational efforts.

It is further preferred that the velocity determination apparatus further comprises an accuracy condition fulfilling determination unit for determining whether an accuracy condition being indicative of the accuracy of the calculation performed by the Doppler frequency calculation unit is fulfilled, wherein the Doppler frequency calculation unit is adapted to calculate the Doppler frequency for the calculation frequency direction, if the accuracy fulfilling determination unit has determined that the accuracy condition is fulfilled. It is further preferred that the velocity determination unit is adapted to determine the velocity in three velocity directions for determining a three-dimensional velocity, wherein the velocity determination apparatus comprises a storage unit for storing velocities, which have been determined over time in a velocity direction, wherein the accuracy condition fulfilling determination unit is adapted to determine, whether an accuracy condition being indicative of the accuracy of the calculation performed by the Doppler frequency calculation unit is fulfilled, depending on the stored velocities. It is further preferred that the accuracy condition fulfilling determination unit is adapted to determine, whether an accuracy condition being indicative of the accuracy of the calculation performed by the Doppler frequency calculation unit is fulfilled, by calculating an average of the stored velocities and by comparing the average with a predefined threshold. Preferentially, before calculating the average the stored velocities are low-pass filtered. This ensures that the Doppler frequency for the calculation frequency direction is determined only, if the calculation is sufficiently accurate, thereby further improving the quality of determining the velocity.

The predefined threshold can be determined by, for example, calibration measurements, wherein the average is calculated, while it is known whether the accuracy of determining the velocity is sufficient or not.

The linear combination of the Doppler frequencies measured for the at least two further frequency directions for calculating the Doppler frequency for the calculation frequency direction is preferentially based on an assumption regarding one or several velocities. In particular, the linear combination can be based on the assumption that the object moves primarily in a horizontal x-y plane, i.e. that the velocity in the vertical direction is zero. The storage unit is preferentially adapted to store velocities, which have been determined over time in a velocity direction, which relates to the assumption. In particular, the storage unit can be adapted to store velocities which correspond to a vertical velocity direction. If the object is a vehicle, which is considered to move generally only on the ground, i.e. in a horizontal plane, it can be assumed that the velocity in the vertical direction is substantially zero. Thus, the Doppler frequency in the calculation frequency direction can be calculated by using an equation, which describes a linear combination of the Doppler frequencies measured in the other frequency directions and which is based on the assumption that the velocity in the vertical direction is zero. The accuracy of calculating the Doppler frequency in the calculation frequency direction depends then on the degree of similarity between already stored velocities, which have been measured in the vertical velocity direction, and zero. In this example, it can be determined, whether the accuracy condition is fulfilled, by comparing the average of the stored velocities, which have been measured for the vertical velocity direction, with a threshold being close to zero.

It is further preferred that the Doppler frequency calculation unit is adapted to determine a faulty frequency direction, in which the measurement of a Doppler frequency is faulty, and to calculate the Doppler frequency for a calculation frequency direction being the faulty frequency direction depending on the Doppler frequencies measured for the at least two further frequency directions of the at least three different frequency directions. For example, the Doppler frequency calculation unit can be adapted to compare the signal-to-noise ratio of, for example, a self-mixing interference signal, with a predefined threshold, in order to determine whether the measurement of the Doppler frequency is faulty. Also other methods can be used for determining a faulty Doppler frequency measurement. For example, the shape of a frequency peak of, for example, a self-mixing interference signal, can be compared with an expected frequency peak, wherein, if the comparison yields a deviation being larger than a predefined threshold, it can be determined that the respective frequency direction is a faulty frequency direction. Or, it can be determined whether the Doppler frequency measured in a certain frequency direction would result in a velocity in this frequency direction, which is within a predefined expected velocity range, wherein, if the velocity is not within the predefined expected velocity range, it can be determined that the measurement in the certain frequency direction is faulty. Moreover, the acceleration can be calculated in the certain frequency direction based on the measured corresponding Doppler frequency and it can be determined whether the acceleration is within a predefined expected acceleration range, in order to determine whether the measurement of the Doppler frequency is faulty. The velocity range and/or acceleration range can be predefined based on known possible velocities and/or accelerations of the object. Also Kalman filtering can be used for determining whether a measurement of a Doppler frequency in a frequency direction is faulty. The Doppler frequency calculation unit is preferentially adapted to calculate the Doppler frequency for the calculation frequency direction, only if the Doppler frequency calculation unit has determined a faulty frequency direction, in which the measurement of a Doppler frequency is faulty, wherein, in this case, the calculation frequency direction is the faulty frequency direction. This can ensure that the Doppler frequency in the calculation frequency direction is only calculated, if the measurement of the Doppler frequency in the calculation frequency direction is indeed faulty, thereby avoiding unnecessary calculations.

It is further preferred that the Doppler frequency measuring unit comprises at least three lasers directed in the at least three different frequency directions for measuring the Doppler frequency in the at least three different frequency directions.

It is further preferred that the Doppler frequency measuring unit is adapted to use a self-mixing interference technique for measuring the Doppler frequencies in the at least three different frequency directions. By using lasers and self-mixing interference the Doppler frequency can be determined with a further improved accuracy.

Since the Doppler frequency measuring unit comprises preferentially at least three lasers directed in the at least three difference frequency directions, the frequency directions can also be regarded as laser beam directions.

It is further preferred that the Doppler frequency determination unit comprises more than three lasers and wherein at least two lasers are directed in the same frequency direction. Since at least two lasers are directed in the same frequency direction, the Doppler frequency is redundantly measured in the same frequency direction. Thus, even if the measurement of the Doppler frequency by one of these two lasers is disturbed, the Doppler frequency can still be measured with high quality by using the other laser of the at least two lasers directed in the same frequency direction. This can further improve the quality of determining the velocity of the object.

It is further preferred that the Doppler frequency determination unit comprises more than three lasers directed in different frequency directions. Since the Doppler frequency determination unit comprises more than three lasers directed in different frequency directions, Doppler frequencies can be determined for more than three frequency directions. Moreover, since more than three lasers are directed in different frequency directions, the different frequency directions are linearly dependent to each other and a Doppler frequency measured for a first frequency direction can also be calculated by linearly combining Doppler frequencies measured for other frequency directions. Thus, also in this embodiment a redundancy is present, which can be used for replacing a measured Doppler frequency by a calculated Doppler frequency, if the measured Doppler frequency is faulty. For example, if the above mentioned Doppler frequency, which has been measured for the first frequency direction, is faulty, this measured Doppler frequency can be replaced by the calculated Doppler frequency, while determining the velocity.

It is further preferred that the Doppler frequency determination unit comprises more than three lasers directed in different frequency directions, wherein the velocity determination unit is adapted to use a first subset of the lasers for determining a first linear velocity and to use a second subset of the lasers for determining a second linear velocity. Preferentially, the velocity determination unit is adapted to determine a rotational parameter, in particular, a rotational position and/or a rotational velocity, of the object based on the determined first and second linear velocities. In particular, the velocity determination unit is adapted to determine at least one of yaw velocity, roll velocity and pitch velocity as the rotational velocity. The lasers for forming the first subset and the second subset can be dynamically chosen. The first subset of the lasers and the second subset of the lasers can be regarded as two virtual sensors. Preferentially, the velocity determination unit is adapted to switch between the first subset of the lasers and the second subset of the lasers such that the first linear velocity and the second linear velocity are consecutively and repeatedly determined, wherein the rotational velocity of the object is determined based on the consecutively and repeatedly determined first and second linear velocities. Since the first subset of the lasers and the second subset of the lasers are different, at least one laser beam direction, i.e. frequency direction, of the first subset of the lasers is different to any of the laser beam directions of the second subset of lasers. A rotational movement of the object like a yaw, pitch, or roll movement, will therefore generally lead to different linear velocities in at least one of the velocity directions. The velocity determination unit can be adapted to determine the rotational velocity based on this difference.

In a further aspect of the present invention an object comprising the velocity determination apparatus for determining a velocity of the object is presented. The object is preferentially a vehicle like a car, a bicycle, a motorcycle, a truck, a train, a ship, a boat, an aircraft, et cetera or another movable object.

In a further aspect of the present invention a velocity determination method for determining a velocity of an object is presented, wherein the velocity determination method comprises:

measuring a Doppler frequency for at least three different frequency directions, calculating a Doppler frequency for a calculation frequency direction of the at least three different frequency directions depending on the Doppler frequencies measured for at least two further frequency directions of the at least three different frequency directions, determining a velocity of the object depending on the calculated Doppler frequency, which has been calculated for the calculation frequency direction, and the Doppler frequencies for the at least two further frequency directions.

In a further aspect of the present invention a velocity determination computer program for determining a velocity of an object interest is presented, wherein the computer program comprises program code means for causing a velocity determination apparatus as defined in claim 1 to carry out the steps of the velocity determination method as defined in claim 14, when the velocity determination computer program is run on a computer controlling the velocity determination apparatus.

It shall be understood that the velocity determination apparatus of claim 1, the object of claim 13, the velocity determination method of claim 14 and the velocity determination computer program of claim 15 have similar and/or identical preferred embodiments, in particular, as defined in the dependent claims.

It shall be understood that a preferred embodiment of the invention can also be any combination of the dependent claims with the respective independent claim.

DETAILED DESCRIPTION OF EMBODIMENTS

Figure 1:
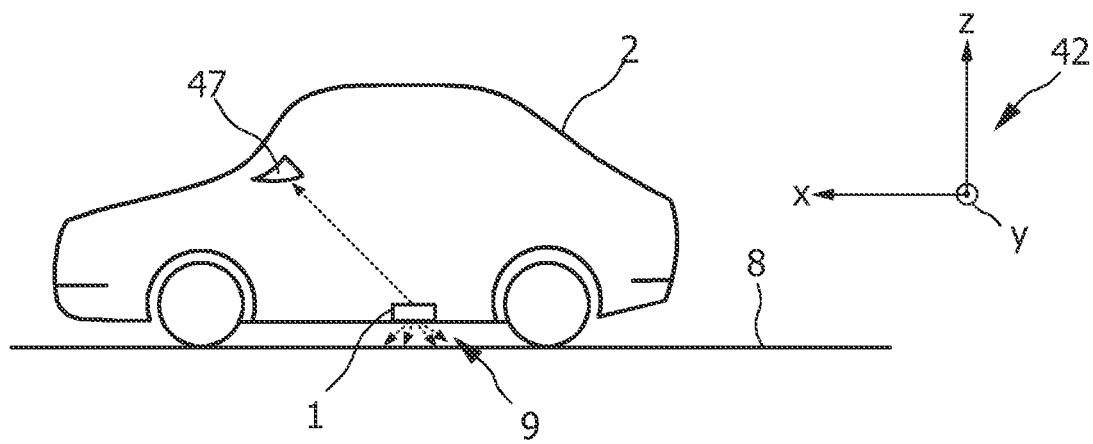
FIG. 1 shows schematically and exemplarily an embodiment of a vehicle comprising an embodiment of a velocity determination apparatus for determining the velocity of the vehicle.
Figure 2:
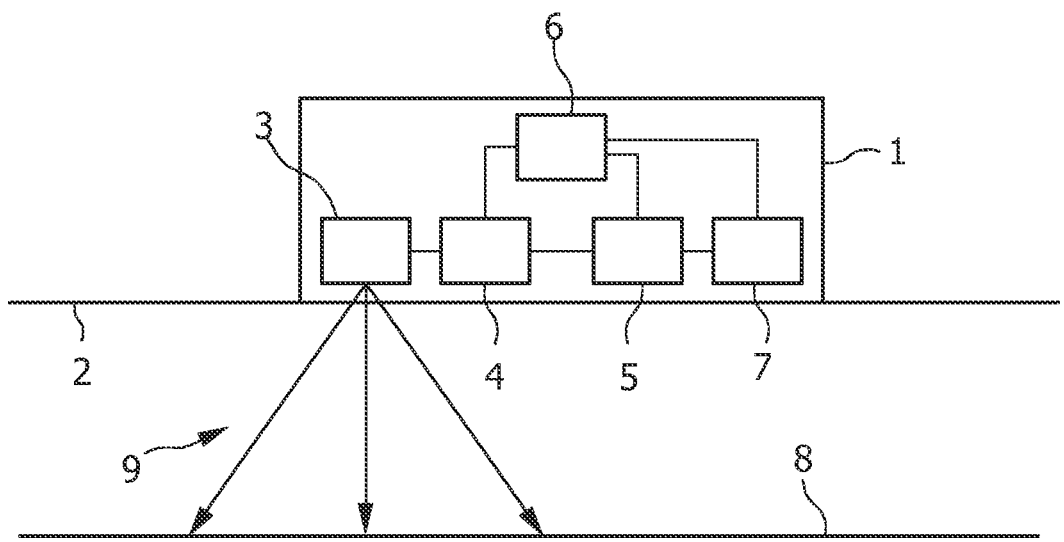
FIG. 2 shows schematically and exemplarily the embodiment of the velocity determination apparatus in more detail.

FIG. 1 shows schematically and exemplarily an object 2 being, in this embodiment, a vehicle, which comprises a velocity determination apparatus 1 for determining a velocity of the vehicle 2. The velocity determination apparatus 1 is schematically and exemplarily shown in more detail in FIG. 2.

The velocity determination apparatus 1 comprises a Doppler frequency measuring unit 3 for measuring a Doppler frequency for three different frequency directions. The Doppler frequency measuring unit 3 is schematically and exemplarily shown in more detail in FIG. 3.

The Doppler frequency measuring unit 3 comprises three lasers 13, 14, 15 for emitting radiation 9 towards the ground 8 in three different frequency directions 10, 11, 12 for measuring the Doppler frequency in these different frequency directions 10, 11, 12. The lasers 13, 14, 15 are controlled by a control unit 16. The Doppler frequency measuring unit 3 is adapted to use a self-mixing interference technique for measuring the Doppler frequencies in the three different frequency directions 10, 11, 12. The laser beam, which is emitted by the respective laser, is reflected by the ground 8 and the reflected light re-enters the cavity of the respective laser. The re-entering of the reflected laser light results in a self-mixing interference within the cavity, thereby generating intensity variations within the cavity. A built-in photodiode or an external photodiode is provided for measuring these intensity variations and for generating a corresponding intensity signal. In another embodiment, the variations can also be measured by measuring fluctuations on a supply current or supply voltage of the respective laser. If an external photodiode is used, a part of the laser light is coupled out and this outcoupled part of the laser light is directed to the external photodiode. The generated intensity signal can be regarded as a self-mixing interference signal and the main frequency of the intensity signal can be regarded as the Doppler frequency. The control unit 16 is therefore preferentially adapted to receive the three intensity signals from the photodiodes, which are assigned to the three lasers 13, 14, 15, and to determine from each of the three intensity signals, i.e. from each of the three self-mixing interference signals, a Doppler frequency for the respective frequency direction 10, 11, 12. For a more detailed description of the self-mixing interference technique reference is made to the article "A Double-Laser Diode Onboard Sensor for Velocity Measurements" by Xavier Raoul et al., IEEE Transactions on Instrumentation and Measurement, vol. 53, no. 1, pages 95 to 101, February 2004, which is herewith incorporated by reference.

The velocity determination apparatus 1 further comprises a Doppler frequency calculation unit 4 for calculating a Doppler frequency for a calculation frequency direction of the three different frequency directions 10, 11, 12 depending on the Doppler frequencies measured for at least to further frequency directions of the at least three different frequency directions 10, 11, 12. The velocity determination apparatus 1 further comprises a velocity determination unit 5 for determining a velocity of the object 2 depending on the calculated Doppler frequency, which has been calculated for the calculation frequency direction, and the Doppler frequencies of the at least two further frequency directions.

Since the Doppler frequency calculation unit 4 is adapted to calculate a Doppler frequency for a calculation frequency direction of the three different frequency directions 10, 11, 12 depending on the Doppler frequencies measured for at least two further frequency directions of the three different frequency directions 10, 11, 12, a reliable Doppler frequency can be determined also in the calculation frequency direction, even if the measurement of the Doppler frequency in this calculation frequency direction is disturbed. The velocity determination unit 5 can therefore determine a velocity of the object 2, even if the measurement of the Doppler frequency in the calculation frequency direction is disturbed, by using the calculated Doppler frequency and the Doppler frequencies measured for the at least two further frequency directions, which are different to the calculation frequency direction. This improves the reliability of determining the velocity of the object 2.

In an embodiment, the Doppler frequency calculation unit 4 is adapted to determine whether the measurement of a Doppler frequency is faulty or not. If the three measured Doppler frequencies are not faulty, the three measured Doppler frequencies are provided to the velocity determination unit 5 for determining the velocity depending on the three measured Doppler frequencies. If one of the measured Doppler frequencies is faulty, the Doppler frequency calculation unit 4 calculates a Doppler frequency depending on the non-faulty measured Doppler frequencies, wherein the velocity determination unit 5 determines the velocity depending on the calculated Doppler frequency and the measured non-faulty Doppler frequencies.

For example, the Doppler frequency calculation unit can be adapted to compare the signal-to-noise ratio of, for example, a self-mixing interference signal, with a predefined threshold, in order to determine whether the measurement of the Doppler frequency is faulty. Also other methods can be used for determining a faulty Doppler frequency measurement. For example, the shape of a frequency peak of, for example, a self-mixing interference signal, can be compared with an expected frequency peak, wherein, if the comparison yields a deviation being larger than a predefined threshold, it can be determined that the respective frequency direction is a faulty frequency direction. Or, it can be determined whether the Doppler frequency measured in a certain frequency direction would result in a velocity in this frequency direction, which is within a predefined expected velocity range, wherein, if the velocity is not within the predefined expected velocity range, it can be determined that the measurement in the certain frequency direction is faulty. Moreover, the acceleration can be calculated in the certain frequency direction based on the measured corresponding Doppler frequency and it can be determined whether the acceleration is within a predefined expected acceleration range, in order to determine whether the measurement of the Doppler frequency is faulty. The velocity range and/or acceleration range can be predefined based on known possible velocities and/or accelerations of the object. Also Kalman filtering can be used for determining whether a measurement of a Doppler frequency in a frequency direction is faulty.

The velocity determination unit 5 is adapted to determine the velocity $v_x$, $v_y$, $v_z$ in three velocity directions $\vec{x}$, $\vec{y}$, $\vec{z}$ for determining a three-dimensional speed. The object 2 moves preferentially in a forward direction $\vec{x}$ horizontal plane, i.e. in a plane parallel to the ground 8, wherein the three velocity directions $v_x$, $v_y$, $v_z$ include preferentially the forward direction $\vec{x}$, a lateral direction $\vec{y}$, which is also within the horizontal plane and which is orthogonal to the forward direction $\vec{x}$, and a vertical direction $\vec{z}$. The three velocity directions $\vec{x}$, $\vec{y}$, $\vec{z}$ are indicated in FIG. 1 by the coordinate system 42.

The three velocity directions $\vec{x}$, $\vec{y}$, $\vec{z}$ are different to the at least three frequency directions 10, 11, 12 such that a velocity in one of the velocity directions $\vec{x}$, $\vec{y}$, $\vec{z}$ is determinable by a combination of Doppler frequencies measured for the three frequency directions 10, 11, 12. In this embodiment, the velocity determination unit 5 is adapted to determine the velocity of the object 2, i.e. the vehicle's ground speed vector $v_x$, $v_y$, $v_z$, in accordance with following equation:

The velocity of the vehicle is preferentially determined in a pre-defined vehicle reference system as described in ISO 8855. The vehicle reference system is a right-hand orthogonal axis system fixed to the vehicle. The positive x-axis points into the driving direction of the vehicle, the positive y-axis points to the left, when looking into the positive x-direction, and the positive z-axis points upwards.

In general, if a target moves away from a velocity sensor, the Doppler frequency is negative, and, if the target moves towards the velocity sensor, the Doppler frequency is positive. In the present embodiment, the target is the road, wherein the velocity of the road $\vec{v}_{road}$ is the negative velocity $\vec{v}$ of the vehicle. The Doppler frequency can therefore be calculated in accordance with following equation:

$$f = -\frac{2}{\lambda}(\vec{e} \cdot \vec{v}_{road}) = \frac{2}{\lambda}(\vec{e} \cdot \vec{v}), \tag{1}$$

wherein $\vec{e}$ is the unity vector of the respective frequency direction. By projecting the frequency directions in the vehicle reference system following equation can be obtained:

$$\begin{pmatrix} v_x \\ v_y \\ v_z \end{pmatrix} = \frac{\lambda}{2} \begin{pmatrix} \sin\theta_1 \cos\phi_1 & \sin\theta_1 \sin\phi_1 & \cos\theta_1 \\ \sin\theta_2 \cos\phi_2 & \sin\theta_2 \sin\phi_2 & \cos\theta_2 \\ \sin\theta_3 \cos\phi_3 & \sin\theta_3 \sin\phi_3 & \cos\theta_3 \end{pmatrix}^{-1} \begin{pmatrix} f_1 \\ f_2 \\ f_3 \end{pmatrix}, \tag{2}$$

wherein $\lambda$, denotes the wavelength of the laser beams emitted by the lasers 13, 14, 15, and $f_1$, $f_2$, $f_3$ denote the Doppler frequencies measured or calculated for the frequency directions 10, 11, 12, respectively.

The angles $\theta_i$ and $\phi_i$ for the frequency directions with the unity vectors $\vec{e}_i$, wherein i=1, 2, 3, are preferentially defined as follows. The angle $\theta_i$ is preferentially the angle between the respective frequency direction and a unit z vector and the angle $\phi_i$ is preferentially the projection of $\vec{e}_i$ on the x-y plane and the unit x vector.

In an embodiment, the angles can be set as follows:

$$\vec{\theta} = 180° - \begin{pmatrix} 25° \\ 25° \\ 25° \end{pmatrix} \text{ and } \vec{\phi} = \begin{pmatrix} 0° \\ 240° \\ 120° \end{pmatrix}. \tag{3}$$

Figure 3:
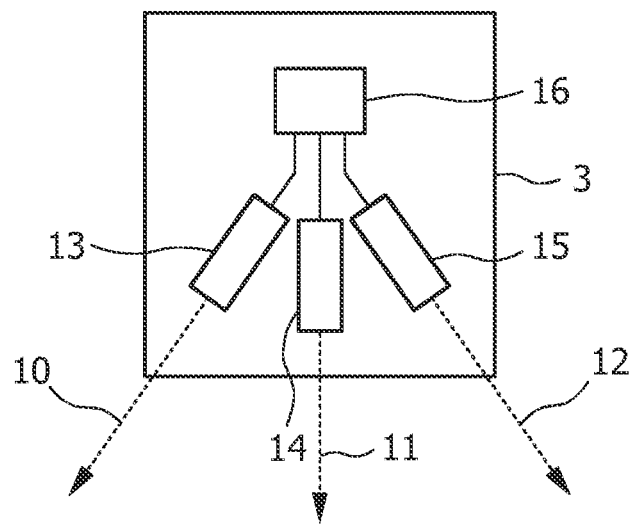
FIG. 3 shows schematically and exemplarily an embodiment of a Doppler frequency measuring unit of the velocity determination unit.
Figure 4:
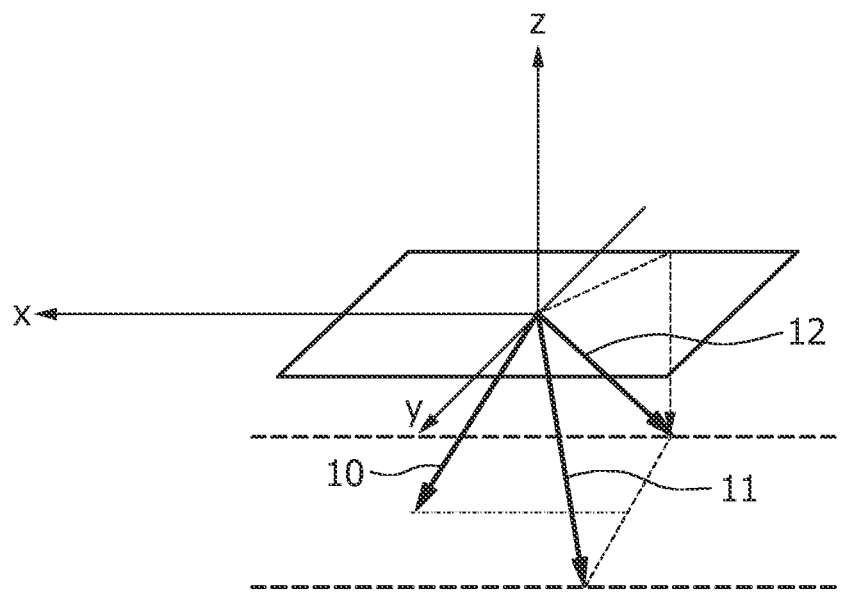
FIG. 4 shows schematically and exemplarily an orientation of frequency directions, in which Doppler frequencies are measured, relative to velocity directions, in which the velocity of the vehicle is determined.

FIG. 3 shows the three frequency directions 10, 11, 12 only schematically, without indicating a preferred three-dimensional orientation of the frequency directions 10, 11, 12. A preferred three-dimensional orientation of the frequency directions 10, 11, 12 is shown in FIG. 4. As can be seen in FIG. 4, the three frequency directions 10, 11, 12 have preferentially the same inclination angel of 25 degrees and azimuth angles of 0, 210 and 330 degrees, respectively.

The Doppler frequencies measured in the different frequency directions 10, 11, 12 are measured independently from each other, i.e. the measurement of a Doppler frequency in a first frequency direction is not influenced by a measurement of a Doppler frequency in a second frequency direction being different to the first frequency direction. In particular, the Doppler frequency measuring unit 3 is adapted to measure in each frequency direction 10, 11, 12 a distinct Doppler frequency.

Due to harsh automotive environment and tough road conditions, one detection channel, i.e. a measurement of a Doppler frequency in one of the frequency directions 10, 11, 12, may fail. For example, the laser beam in one frequency direction may be temporally blocked by scattering objects between the respective laser and the road surface 8, or the self-mixing feedback, i.e. the intensity of the reflected light which has re-entered the respective cavity, has become too weak due to large defocus. If the measurement of a Doppler frequency in one frequency direction fails, a reliable determination of the velocity in accordance with equation (2) would generally not be possible. However, under the assumption that the vehicle's vertical speed is relatively small compared to the forward and lateral components, the three-channel system, i.e. equation (2), is overdetermined. This leads to following equation:

$$v_z \approx 0 \approx \frac{\lambda}{2}(\cos\theta_1 f_1 + \cos\theta_2 f_2 + \cos\theta_3 f_3) \tag{4}$$

By using equation (4) the Doppler frequency of the failing detection channel, i.e. the faulty Doppler frequency in a certain frequency direction which may be, in an example, the frequency direction indicated by 10 in FIGS. 3 and 4, can be recovered from the other detection channels, i.e. from the Doppler frequencies measured in the other frequency directions 11, 12. In particular, if the angles $\theta_1$, $\theta_2$, $\theta_3$ are equal, the faulty Doppler frequency in the certain frequency direction may be recovered from the Doppler frequencies measured in the other frequency directions in accordance with following equation:

$$f_1 \approx (f_2 + f_3). \tag{5}$$

Thus, in this example the Doppler frequency calculation unit 4 is adapted to calculate the Doppler frequency 11 for the calculation frequency direction 10 depending on a linear combination of the Doppler frequencies $f_2$, $f_3$ measured for the other two frequency directions 11, 12. In particular, the Doppler frequency calculation unit 4 is adapted to calculate the Doppler frequency $f_1$ for the calculation frequency direction 10 depending on the negative sum of the Doppler frequencies $f_2$, $f_3$ measured for the other two frequency directions 11, 12. This allows calculating the Doppler frequency $f_1$ for the calculation frequency direction 10 with low computational efforts.

Figure 5:
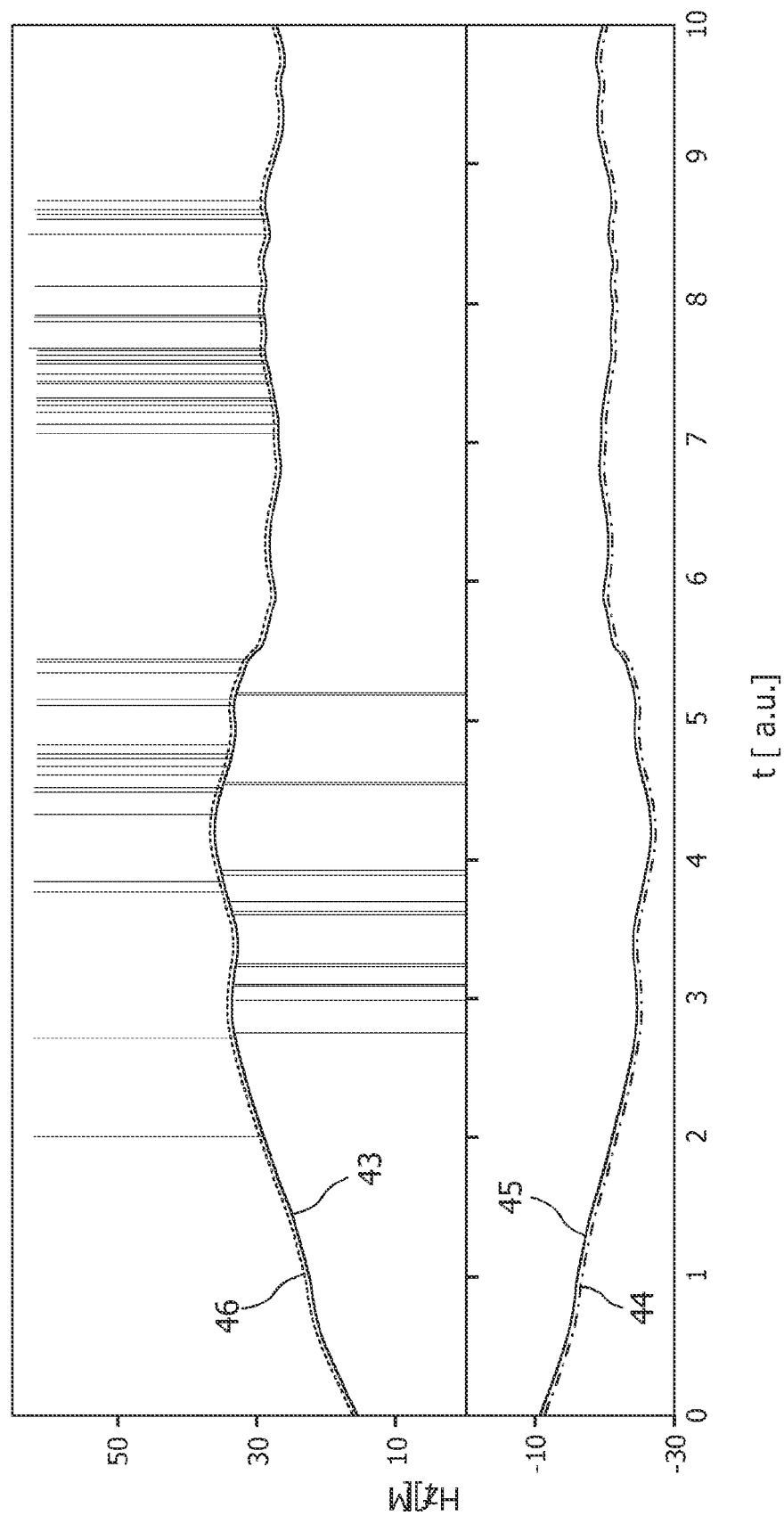
FIG. 5 shows exemplarily Doppler frequencies depending on time.

FIG. 5 shows exemplarily measured and calculated frequencies f in MHz depending on the time t in arbitrary units. The curves denoted by 43, 44 and 45 represent the measured Doppler frequencies $f_1$, $f_2$, $f_3$, respectively. The Doppler frequencies $f_2$, $f_3$ do not show jumps or the like, which would indicate failures in measuring the respective Doppler frequency. However, the curve 43 representing the measured Doppler frequency $f_1$ shows jumps indicating that the measurement of the Doppler frequency $f_1$ is faulty. FIG. 5 further shows a curve 46 representing a calculated Doppler frequency $f_1$, which may be calculated in accordance with equation (5) and which does not show the jumps. Thus, although one detection channel, i.e. the measurement of the Doppler frequency in the calculation frequency direction 10, was temporally out of work, for example, due to low signal quality, the drop outs are nicely recovered from the other two detection channels, i.e. from the Doppler frequencies measured in the other frequency directions 11, 12. Based on the assumption that the vertical speed is zero, the vehicle's ground speed is still measureable.

The velocity determination apparatus 1 further comprises an accuracy condition fulfilling determination unit 6 for determining whether an accuracy condition, which is indicative of the accuracy of the calculation performed by the Doppler frequency calculation unit 4 and which may also be regarded as signal strength condition, is fulfilled, wherein the Doppler frequency calculation unit 4 is adapted to calculate the Doppler frequency $f_1$ for the calculation frequency direction 10, if the accuracy fulfilling determination unit 6 has determined that the accuracy condition is fulfilled. The velocity determination apparatus 1 further comprises a storage unit 7 for storing velocities, which have been determined over time in a velocity direction, wherein the accuracy condition fulfilling determination unit 6 is adapted to determine, whether an accuracy condition being indicative of the accuracy of the calculation performed by the Doppler frequency calculation unit 4 is fulfilled, depending on the stored velocities. The accuracy condition fulfilling determination unit 6 can be adapted to determine, whether an accuracy condition being indicative of the accuracy of the calculation performed by the Doppler frequency calculation unit 4 is fulfilled, by calculating an average of the stored velocities and by comparing the average with a predefined threshold. Preferentially, before calculating the average the stored velocities are low-pass filtered.

In this embodiment, the storage unit 7 is adapted to store velocities $v_z$ which correspond to the vertical velocity direction $\vec{z}$, wherein it can be assumed that the velocity $v_z$ in the vertical direction $\vec{z}$ is substantially zero. The accuracy of calculating the Doppler frequency $f_1$ in the calculation frequency direction 10 depends then on the degree of similarity between the already stored velocities $v_z$, which have been measured in the vertical velocity direction $\vec{z}$, and zero. In this example, the accuracy condition fulfilling determination unit 6 is adapted to determine, whether the accuracy condition is fulfilled, by comparing the average of stored velocities $v_z$, which have been measured for the vertical velocity direction $\vec{z}$, with a threshold close to zero. The threshold is preferentially a predefined threshold which can be determined by, for example, calibration measurements, wherein the average is calculated, while it is known whether the accuracy of determining the velocity is sufficient or not.

Thus, the accuracy condition fulfilling determination unit 6 ensures that the vertical speed is small enough, when calculating the Doppler frequency in the calculation frequency direction, by monitoring the history of the vertical speed. The accuracy condition fulfilling determination unit 6 can therefore distinguish between cases where the above mentioned approach in accordance with equations (4) and (5) would lead to a too low accuracy, indicating a hard failure of the velocity determination apparatus, and cases where accuracy requirements are met and the velocity determination apparatus can continue with the determination of the velocity.

As can be retrieved from equation (4), also the other two frequencies $f_2$, $f_3$ can be calculated. In particular, if the angles $\theta_1$, $\theta_2$, $\theta_3$ are equal, the other two frequencies $f_2$, $f_3$ can be calculated in accordance with following equations:

$$f_2 \approx -(f_1+f_3) \text{ and} \qquad (6)$$

$$f_3 \approx -(f_1+f_2), \qquad (7)$$

if the measurement of the Doppler frequency in the frequency direction 11 or in the frequency direction 12, respectively, are faulty.

The Doppler frequency calculation unit 4 is adapted to not only calculate the absolute value of the Doppler frequency, but also the sign of the Doppler frequency, wherein the velocity determination unit 5 is adapted to determine the absolute value of the velocity and also the direction of the velocity. In accordance with equation (3), in particular, in accordance with equations (5) to (7), the sign of the respective calculated Doppler frequency can be determined and the determined sign of the calculated Doppler frequency can be used for determining the direction of the velocity of the vehicle 2. Hence, from the sign of two detection channels, i.e. from the sign of the Doppler frequencies measured in two frequency directions, the sign of the other detection channel, i.e. the sign of the Doppler frequency in the other frequency direction, can be checked and repaired, if required. The direction detection reliability can therefore be increased.

The velocity determination unit 5 is preferentially adapted to send the determined velocity to a display 47 for showing the determined velocity to a person. The velocity determination unit 5 and the display 47 can be adapted to communicate wirelessly or via a wired data connection.

Figure 6:
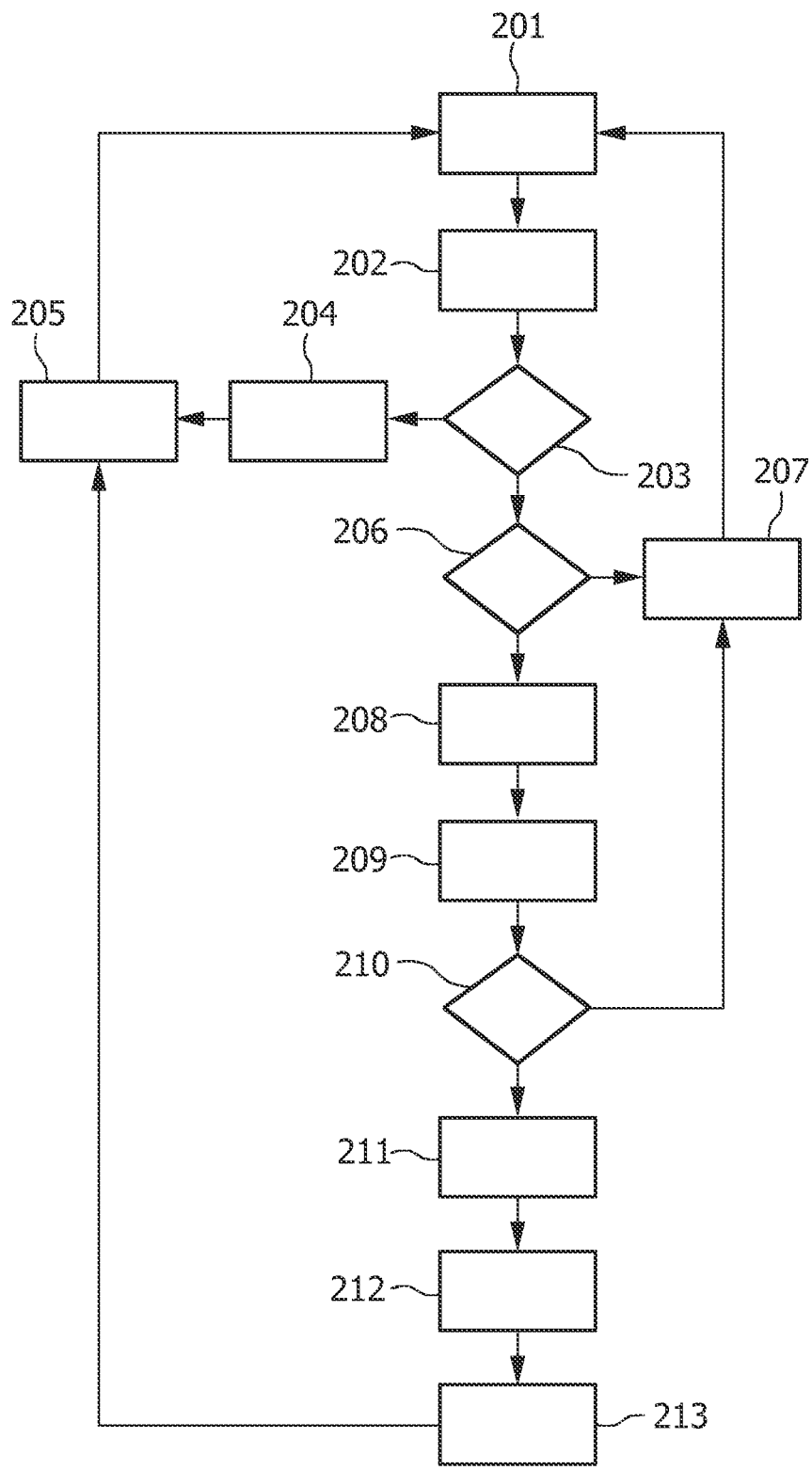
FIG. 6 shows exemplarily a flowchart illustrating an embodiment of a velocity determination method for determining the velocity of the vehicle.

In the following an embodiment of a velocity determination method for determining the velocity of an object will exemplarily be described with reference to a flowchart shown in FIG. 6.

In step 201, the Doppler frequencies $f_1$, $f_2$, $f_3$ are measured for the three different frequency directions 10, 11, 12. In step 202, the velocity $v_x$, $v_y$, $v_z$ of the object 2 is determined depending on the three measured frequencies $f_1$, $f_2$, $f_3$, preferentially, in accordance with equation (2). In step 203, it is determined whether the measurement of the Doppler frequency in one of the different frequency directions 10, 11, 12 is faulty. If in step 203 it is determined that the measurement of the Doppler frequency is not faulty in any of the frequency directions 10, 11, 12, the vertical velocity $v_z$ is stored in step 204, and the determined velocity is sent to the display 47 for showing the determined velocity in step 205. The method then continues with step 201.

If in step 203 it has been determined that the measurement of the Doppler frequency in one of the frequency directions 10, 11, 12 is faulty, in step 206 it is determined whether one or several vertical velocities $v_z$ have already been stored. If a vertical velocity $v_z$ has not already been stored, in step 207 an error message is shown in the display 47 or the display 47 is just not updated, thereby displaying a previously determined velocity.

If in step 206 it is determined that vertical velocities $v_z$ have already been stored, in step 208 the stored vertical velocities $v_z$ are low-pass filtered and the low-pass filtered vertical velocities are averaged in step 209 for determining an average. The low-pass filtering can be performed by carrying out a running average over a certain number of the last measurements, for example, over the last ten measurements, or by other known low-pass filtering procedures. In step 210, the absolute value of the average is compared with a predefined threshold close to zero. The threshold can be predefined by calibration measurements as mentioned above. If the absolute value of the average is not smaller than the predefined threshold, the accuracy condition, i.e. that the vertical velocity $v_z$ is substantially zero, is not fulfilled and the method continues with step 207. If the absolute value of the average is smaller than the predefined threshold, the accuracy condition is fulfilled and the method continues with step 211.

In step 211 for the faulty measured Doppler frequency a Doppler frequency is calculated depending on the other two measured Doppler frequencies in accordance with one of the above mentioned equations (5) to (7), and, in step 211, the velocity is determined depending on the calculated Doppler frequency, which has been calculated for a calculation frequency direction, i.e. for the frequency direction in which a faulty Doppler frequency has been measured, and the Doppler frequencies measured in the two other frequency directions. In step 212, the vertical part $v_z$ of the determined velocity is stored, and the determined velocity is sent to and shown on the display 47 in step 205. The method then continues with step 201.

Figure 7:
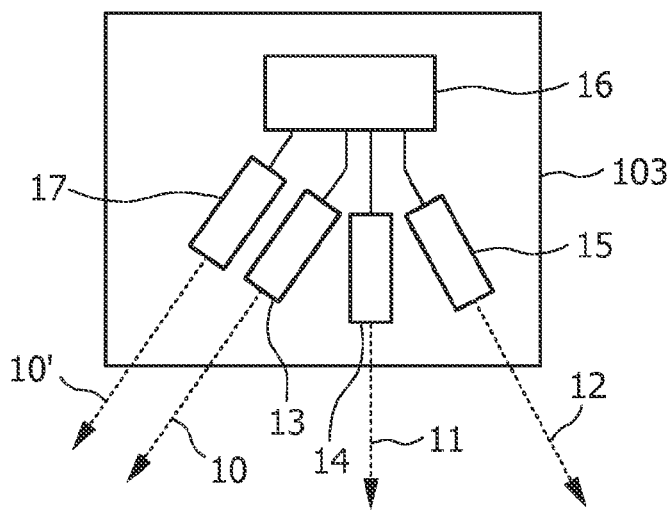
FIG. 7 shows schematically and exemplarily a further embodiment of the Doppler frequency measuring unit.

FIG. 7 shows schematically and exemplarily a further embodiment of the Doppler frequency measuring unit, which can be used with the further components described above, in particular, with reference to FIG. 2.

The Doppler frequency measuring unit 103 shown in FIG. 7 comprises four lasers 13, 14, 15, 17, wherein two lasers 13, 17 are directed in the same frequency direction 10, 10'. Since the two lasers 13, 17 are directed in the same frequency direction 10, 10', the Doppler frequency is redundantly measured in the same frequency direction 10, 10'. Thus, even if the measurement of the Doppler frequency by one of the two lasers 13, 17 is disturbed, the Doppler frequency can still be measured with high quality by using the other of the two lasers 13, 17 in the same frequency direction 10, 10'. This further improves the quality of determining the velocity of the object 2. If the measurement of one of the Doppler frequencies measured by using the lasers 13, 17 is disturbed, the Doppler frequency measured by the other laser of the two lasers 13, 17, which may not be disturbed, can be provided to the velocity determination unit for determining the velocity of the object 2. If the Doppler frequencies measured by the lasers 13, 17 are both undisturbed, the Doppler frequencies can be averaged and the averaged Doppler frequency can be used together with the other measured Doppler frequencies for determining the velocity of the object.

In a further embodiment, the Doppler frequency determination unit comprises more than three lasers directed in different frequency directions. Since, in this other embodiment, the Doppler frequency determination unit comprises more than three lasers directed in different frequency directions, Doppler frequencies can be determined for more than three frequency directions. If the measurement of a Doppler frequency in one of the frequency directions is faulty, the Doppler frequencies measured in other three frequency directions can be used for determining the velocity.

For improving the reliability and extending the lifetime of the velocity determination apparatus redundant lasers may therefore be provided. A plurality of redundant lasers may be monolithically integrated in a multi-laser dice or embodied as discrete devices. In both cases, sub-pluralities of those lasers might share an optical system and an optical path forming measurement channels with redundant lasers. In another embodiment, each individual laser can have a partially or entirely individual optical system.

The redundant lasers can be regarded as providing redundant measurement channels sharing the same or several signal processing units, which can be the above mentioned Doppler frequency calculation unit and the velocity determination unit. Using spatially separated, in particular, by means of individual optical systems, redundant measurement channels sharing the same one or several signal processing units can provide the following benefits: a) the possibility to use different measurement channels with different measurement plans, wherein the different measurement plans can be different in optical power, duty cycle and pulse width and still obey eye safety requirements, and b) the definition of virtual sensors by selecting and grouping separate subsets of measurement channels.

Regarding the measurement plans, measurement reliability in difficult working conditions, in particular, in low signal-to-noise ratio conditions, can be improved by a simultaneously increasing optical power, widening pulse width and lowering duty cycle. However, if the combination of optical power, pulse width and duty cycle leads to laser intensities being larger than a threshold related to eye safety, this combination can not be used by the velocity determination unit. In order to increase the signal-to-noise ratio, while the measurements with the lasers are still eye safe, different measurement plans can be used as exemplarily described in the following with reference to FIG. 8.

Figure 8:
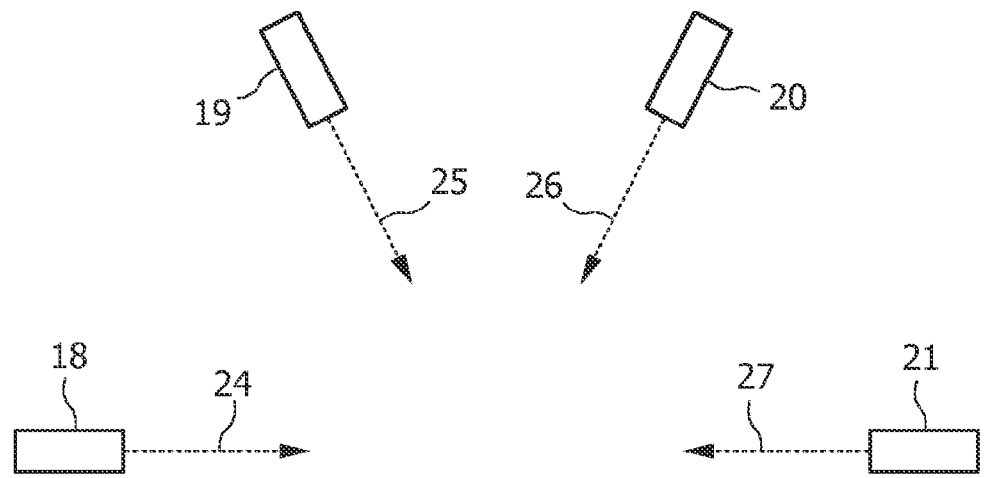
FIGS. 8 and 9 show possible configurations of lasers and frequency directions of further embodiments of the Doppler frequency measuring unit.
Figure 8:
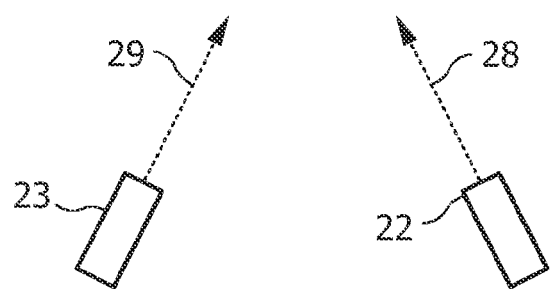

FIG. 8 shows schematically and exemplarily an arrangement of lasers 18 . . . 23 measuring Doppler frequencies in the frequency directions 24 . . . 29. In this embodiment, a subset of lasers, for example, lasers 18, 20, 22, is controlled in accordance with a first measurement plan, and a second subset of lasers, for example, lasers 19, 21, 23, is controlled in accordance with a second measurement plan being different to the first measurement plan. The first and second measurement plans are adapted such that self-mixing interference signals can be generated with an acceptable signal-to-noise ratio, while eye safety requirements are fulfilled. For instance, according to the first measurement plan the lasers 18, 20 and 22 can emit laser beams having a power of 1 mW at a wavelength of 850 nm, a pulse width of 0.3 ms and a repetition frequency of 1 kHz. The second measurement plan can define that the lasers 19, 21, 23 emit laser light having a power of 1.9 mW at a wavelength of 850 nm, a pulse width of 3 ms and a repetition frequency of 10 Hz. The combination of both measurement plans on a single set of lasers is prohibited by the eye safety requirements, but in case of spatially separated optical measurement channels, their combination is allowed. By means of applying the second measurement plan, the measurement reliability can be considerably improved in worst signal conditions, because it combines a longer measurement time with higher optical power.

It is further preferred that the Doppler frequency determination unit comprises more than three lasers directed in different frequency directions, wherein the velocity determination unit is adapted to use a first subset of the lasers for determining a first linear velocity and to use a second subset of the lasers for determining a second linear velocity. The geometrical configuration of the different virtual sensors can be chosen such that the linear speed vector measured by the different virtual sensors becomes sensitive or indifferent to the angular position of the vehicle body. For instance, the configuration with azimuth angles as defined in equation (8), $$\vec{\phi} = \begin{pmatrix} 90° \\ 210° \\ 330° \end{pmatrix}, \tag{8}$$

is sensitive to a change of roll angle, but indifferent to a change of the pitch angle, while the configuration with azimuth angles as defined by equation (9), $$\vec{\phi} = \begin{pmatrix} 0° \\ 240° \\ 120° \end{pmatrix} \tag{9}$$

is sensitive to the change of the pitch angle, but indifferent to the change of the roll angle. In this way, by choosing a proper angular configuration of the virtual sensors, and mathematically manipulating the separately measured linear speed vectors, angular coordinates and velocities, i.e. rotational positions and rotational velocities, of the vehicle body can be calculated. Another way of measuring an angular coordinate and velocity is to configure simpler virtual sensors, which can directly measure an angular coordinate. For example, a two-laser sensor, having a configuration according equation (10), will be able to measure directly the pitch angle of the vehicle body:

$$\vec{\phi} = \begin{pmatrix} 0° \\ 180° \end{pmatrix} \quad (10)$$

Preferentially, the velocity determination unit is adapted to determine a rotational velocity of the object based on the determined first and second linear velocities. In particular, the velocity determination unit is adapted to determine at least one of yaw angle and/or velocity, roll angle and/or velocity and pitch angle and/or velocity as the rotational angle or velocity. The lasers for forming the first subset and the second subset can be dynamically chosen. The first subset of the lasers and the second subset of the lasers can be regarded as two virtual sensors. Preferentially, the velocity determination unit is adapted to switch between the first subset of the lasers and the second subset of the lasers such that the first linear velocity and the second linear velocity are consecutively and repeatedly determined, wherein the rotational velocity of the object is determined based on the consecutively and repeatedly determined first and second linear velocities. Since the first subset of the lasers and the second subset of the lasers are different, at least one laser beam direction, i.e. frequency direction, of the first subset of the lasers is different to any of the laser beam directions of the second subset of lasers. A rotational movement of the object like a yaw, pitch, or roll movement, will therefore generally lead to different linear velocities in at least one of the velocity directions. The velocity determination unit can be adapted to determine the rotational velocity based on this difference.

The relation between this difference and the rotational velocity can be determined by simple mathematical considerations or by calibration measurements, wherein the difference is measured, while a known rotational velocity is present. The velocity determination unit is preferentially adapted to determine the rotational velocity based on the actually measured difference and the determined relations between rotational velocities and differences. In an initialization procedure, the rotational position of the vehicle can be determined, wherein during driving the vehicle the actual rotational position can be determined based on the initially determined or previously determined rotational position and the determined rotational velocity. In a preferred embodiment, the angles defining the rotational position of the vehicle are initially set to zero.

The vehicle is assumed to be a rigid body such that a local velocity $\vec{v}(x, y, z)$, which is measured at the location x, y, z, can be defined as the sum of the velocity vector $\vec{v}_{cm}(x, y, z)$ of the center of mass of the vehicle and a rotation around the center of mass in accordance with following equation:

$$\vec{v}(x,y,z) = \vec{v}_{cm}(x,y,z) + \vec{R} \text{ rot } \vec{r}, \quad (11)$$

wherein $\vec{R}$ is a rotation vector having a magnitude being proportional to the amount of the rotational velocity and a direction being perpendicular the plane of rotation, and $\vec{r}$ is a connecting vector between the location x, y, z and the center of mass. The Doppler frequency measuring unit can be adapted to measure Doppler frequencies at at least two different locations, wherein the velocity determination unit can be adapted to determine the velocity of the vehicle at these at least two different locations and to determine the rotation vector $\vec{R}$ based on the velocities determined that the at least two different locations and based on equation (12).

Separate subsets of channels, i.e. separate lasers emitting laser beams in different frequency directions, can be selected and grouped, in order to define virtual sensors, in particular, in realtime. This will in the following be exemplarily described in more detail with reference to FIG. 9.

Figure 9:
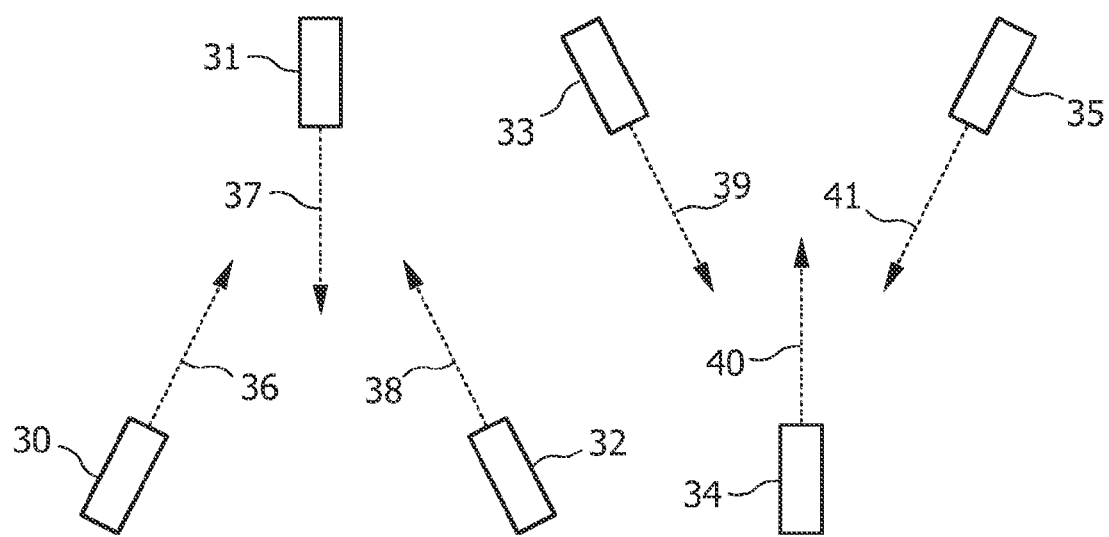

FIG. 9 shows schematically and exemplarily an arrangement of lasers 30 . . . 35 emitting laser light in different frequency directions 36 . . . 41 for measuring Doppler frequencies in these frequency directions 36 . . . 41. For instance, the following two subsets can be formed: a first subset with lasers 30, 31, 32 and a second subset with lasers 33, 34, 35. Both subsets can be considered as two separate virtual sensors, which are spatially separated. The Doppler frequencies measured by using the lasers of the respective subset can be used for determining a three-dimensional speed vector for each of the two separate sensors defined by the first and second subsets. The two three-dimensional speed vectors can be used to calculate additional parameters of the vehicle dynamics like yaw, roll and/or pitch angles. As already mentioned above, the virtual sensors may be reconfigured dynamically. For example, in a first configuration the first subset can comprise the lasers 30, 31, 32 and the second subset can comprise the lasers 33, 34, 35, and in a second configuration the first subset can comprise the lasers 30, 33, 34 and the second subset can comprise the lasers 31, 32, 35.

The virtual sensors can share the same hardware and software signal processing resources, in order to reduce sensor complexity.

Although in the embodiments described above with reference to FIGS. 1 to 4 the Doppler frequency measuring unit comprises only three lasers for measuring Doppler frequencies in three frequency directions, also the embodiment described with reference to FIGS. 1 to 4 can comprise more than three lasers for measuring the Doppler frequencies in more than three frequency directions.

Although in the above described embodiments lasers have been used for optically measuring the Doppler frequency, in other embodiments other means can be used for measuring the Doppler frequency in another way. For example, the Doppler frequency can acoustically be determined by using acoustical sensors for sending out acoustical waves and for receiving acoustical waves. For example, ultrasound transducers can be used for acoustically measuring the Doppler frequencies.

Although in the above described embodiments, the Doppler frequency has been optically determined by using a self-mixing interference technique, the Doppler frequency can also optically be determined by using another optical technique like conventional interferometry.

Although in FIG. 1 the vehicle is shown to be a car, the vehicle can also be a bicycle, a motorcycle, a truck, a train, a ship, a boat, an aircraft, et cetera or another movable object.

Although in an above described embodiment the determined velocity is sent to a display for showing the determined velocity to a person, in addition or alternatively, the velocity determination unit can be adapted to send the determined velocity to another unit like an anti blocking unit, an electronic stability control unit, an adaptive cruise control unit, a parking assistance unit, et cetera.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations and determinations like the calculation of a Doppler frequency, the calculation of a velocity, the determination whether an accuracy condition is fulfilled, et cetera performed by one or several units or devices can be performed by any other number of units or devices. The calculations and determinations and/or the control of the velocity determination apparatus in accordance with the velocity determination method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a velocity determination apparatus for determining a velocity of an object. A Doppler frequency measuring unit is adapted to measure Doppler frequencies in at least three different frequency directions, wherein a Doppler frequency calculation unit is adapted to calculate a Doppler frequency for a calculation frequency direction being similar to one of the at least three different frequency directions depending on the Doppler frequencies measured for at least two further frequency directions of the at least three different frequency directions. The velocity can then be determined depending on the calculated Doppler frequency and the measured Doppler frequencies. Since in the calculation frequency direction the measured Doppler frequency is not needed for determining the velocity, a reliable velocity can be determined also in the calculation frequency direction, even if the measurement of the Doppler frequency in this calculation frequency direction is disturbed.

The invention claimed is:

1. A velocity determination apparatus for determining a velocity of an object, the velocity determination apparatus comprising:
   at least three radiation sources configured to emit radiation in at least three different frequency directions respectively;
   a Doppler frequency measuring unit configured to measure a Doppler frequency based on the radiation reflected in the at least three different frequency directions;
   a Doppler frequency calculation unit configured to determine whether the measured Doppler frequency in one frequency direction of the at least three different frequency directions is faulty based on a predetermined criterion, wherein when the measured Doppler frequency in the one frequency direction is faulty, the Doppler frequency calculation unit is further configured to calculate the Doppler frequency for the one frequency direction based on the Doppler frequencies measured for at least two further frequency directions of the at least three different frequency directions, such that the faulty Doppler frequency is replaced with the calculated Doppler frequency in the one frequency direction; and
   a velocity determination unit configured to determine a velocity of the object based on the calculated Doppler frequency and the measured Doppler frequencies for the at least two further frequency directions.

2. The velocity determination apparatus as defined in claim 1, wherein the velocity determination unit is configured to determine the velocity in three velocity directions for determining a three-dimensional velocity, wherein the three velocity directions are different to the at least three frequency directions, such that a velocity in one of the velocity directions is determinable by a combination of Doppler frequencies measured for the at least three frequency directions.

3. The velocity determination apparatus as defined in claim 1, wherein the Doppler frequency calculation unit is configured to calculate the Doppler frequency for the one frequency direction based on a linear combination of the Doppler frequencies measured for the at least two further frequency directions.

4. The velocity determination apparatus as defined in claim 1, wherein the velocity determination apparatus further comprises an accuracy condition fulfilling determination unit for determining whether an accuracy condition being indicative of the accuracy of the calculation performed by the Doppler frequency calculation unit is fulfilled, wherein the Doppler frequency calculation unit is configured to calculate the Doppler frequency for the one frequency direction if the accuracy fulfilling determination unit determines that the accuracy condition is fulfilled.

5. The velocity determination apparatus as defined in claim 4, wherein the velocity determination unit is configured to determine the velocity in three velocity directions for determining a three-dimensional velocity, wherein the velocity determination apparatus comprises a storage unit for storing velocities, which have been determined over time in a velocity direction, wherein the accuracy condition fulfilling determination unit is configured to determine whether an accuracy condition being indicative of the accuracy of the calculation performed by the Doppler frequency calculation unit is fulfilled by calculating an average of the stored velocities and comparing the average with a predefined threshold.

6. The velocity determination apparatus as defined in claim 5, wherein the accuracy condition fulfilling determination unit is configured to determine whether an accuracy condition being indicative of the accuracy of the calculation performed by the Doppler frequency calculation unit is fulfilled by calculating an average of the stored velocities and by comparing the average with a predefined threshold.

7. The velocity determination apparatus as defined in claim 5, wherein the storage unit is configured to store velocities which correspond to a vertical velocity direction.

8. The velocity determination apparatus as defined in claim 1, wherein the at least three radiation sources are at least three lasers.

9. The velocity determination apparatus as defined in claim 8, wherein the Doppler frequency measuring unit is configured to use a self-mixing interference technique for measuring the Doppler frequencies in the at least three different frequency directions.

10. The velocity determination apparatus as defined in claim 8, wherein the Doppler frequency determination unit comprises at least four lasers directed in different frequency directions, wherein the velocity determination unit is configured to use a first subset of the lasers for determining a first linear velocity and to use a second subset of the lasers for determining a second linear velocity.

11. The velocity determination apparatus as defined in claim 10, wherein the velocity determination unit is configured to determine a rotational parameter of the object based on the determined first and second linear velocities.

12. A velocity determination method for determining a velocity of an object, the velocity determination method comprising:
   emitting radiation in at least three different frequency directions;
   measuring a Doppler frequency based on the radiation reflected in the at least three different frequency directions,
   determining whether the measured Doppler frequency in one frequency direction of the at least three different frequency directions is faulty based on a predetermined criterion, wherein when the measured Doppler frequency in the one frequency direction is faulty, calculating the Doppler frequency for the one frequency direction based on the Doppler frequencies measured for at least two further frequency directions of the at least three different frequency directions, such that the faulty Doppler frequency is replaced with the calculated Doppler frequency in the one frequency direction; and,
   determining a velocity of the object based on the calculated Doppler frequency and the measured Doppler frequencies for the at least two further frequency directions.

13. A non-transitory computer readable medium comprising a velocity determination computer program for determining a velocity of an object, when the velocity determination computer program is run on a computer controlling the velocity determination apparatus, the velocity determination computer program causes the velocity determination apparatus to carry out the process of:
   emitting radiation in at least three different frequency directions;
   measuring a Doppler frequency based on the radiation reflected in the at least three different frequency directions;
   determining whether the measured Doppler frequency in one frequency direction of the at least three different frequency directions is faulty based on a predetermined criterion, wherein when the measured Doppler frequency in the one frequency direction is faulty, calculating the Doppler frequency for the one frequency direction based on the Doppler frequencies measured for at least two further frequency directions of the at least three different frequency directions, such that the faulty Doppler frequency is replaced with the calculated Doppler frequency in the one frequency direction; and
   determining a velocity of the object based on the calculated Doppler frequency and the measured Doppler frequencies for the at least two further frequency directions.

* * * * *